May 26, 1931.    W. LANGEWIESCHE    1,807,218
ELECTRIC MACHINE
Filed April 10, 1928    2 Sheets-Sheet 1
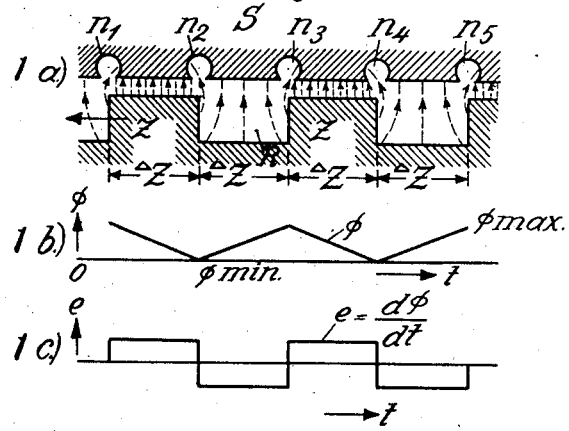
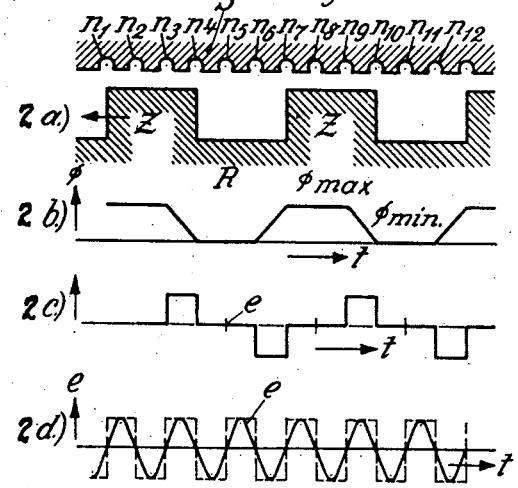
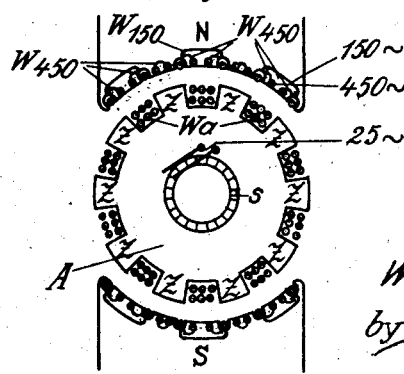
Inventor:
Wilhelm Langewiesche
by Samuel Ostrolenk
Attorney May 26, 1931.　　W. LANGEWIESCHE　　1,807,218
ELECTRIC MACHINE
Filed April 10, 1928　　2 Sheets-Sheet 2
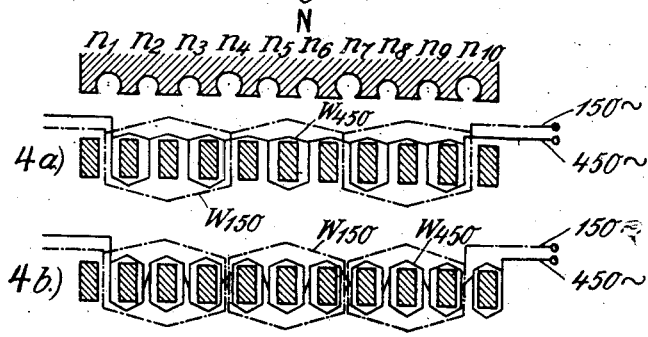
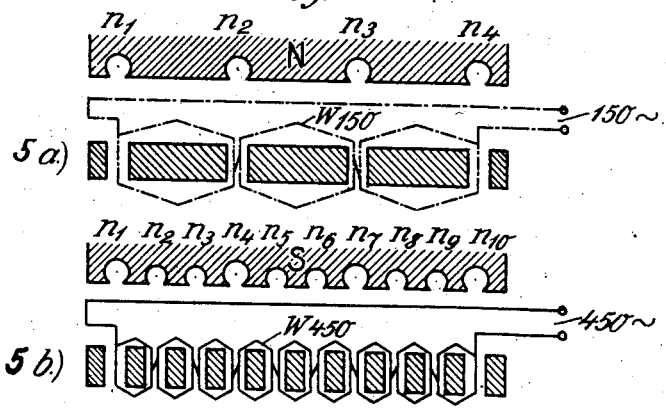
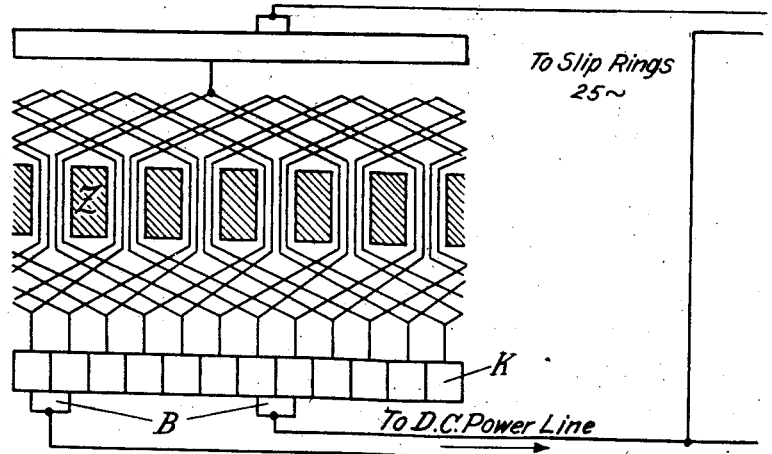
Inventor:
Wilhelm Langewiesche
by Samuel Ostrolenk
Attorney Patented May 26, 1931

1,807,218

UNITED STATES PATENT OFFICE

WILHELM LANGEWIESCHE, OF BERLIN-TEMPELHOF, GERMANY, ASSIGNOR TO C. LORENZ-AKTIENGESELLSCHAFT, OF BERLIN-TEMPELHOF, GERMANY

ELECTRIC MACHINE

Application filed April 10, 1928, Serial No. 268,938, and in Germany March 18, 1927.

The present invention relates to an alternating current electrical generator, more particularly for the simultaneous generation of several preferably harmonic frequencies, and is especially applicable to those cases in which it is desired to generate, in the simplest and cheapest manner possible, several currents of different frequencies which are preferably in harmonic relation to each other. This case is, for instance, met with in the so-called calling machines for telephone exchanges for signalling purposes. As is well known in connection with telephone exchanges, for the purpose of transmitting the various operating or service signals, for instance for calling up, a frequency of 25 periods per second which gives a deep note is used, for the transmission of "busy" signals a frequency of 150 periods per second which gives a note of medium pitch, and finally for the purpose of transmitting the "hold-on" signal, a frequency of 450 periods per second which produces a relatively high note. The present invention is however by no means limited to such special calling machines, but can be applied in all cases in which it is desired to generate alternating current of any desired frequency or frequencies.

The invention relates especially to machines for alternating-current generation which act on the homopolar inductor principle, in accordance with which, as is well known, the electromotive forces are generated in a winding by subjecting a normally constant and uni-directional magnetic flux threading through the winding, to periodic changes, such as for instance, by moving an iron member provided with teeth and slots past the winding. The magnetic flux threading the winding will thus undergo periodic fluctuations caused by the different magnetic permeability of consecutive teeth and slots and in alternating current will be generated in the winding. The invention will be explained more fully with reference to the accompanying drawings, in which:—

Figure 1 explains the method of alternating-current generation on which the invention is based, Figure 2 shows a construction according to the invention, Figure 3 shows, by way of example, the application of the invention to a call signal machine for telephone exchanges.

Figure 4 shows in more detail, one form of arrangement of the stator winding of a machine as shown by Fig. 3.

Figure 5 illustrates another mode of arranging the different windings in a generator in accordance with Fig. 3

Figure 6 represents a wiring diagram of the armature of the machine according to Fig. 3 to be used in this special embodiment of the invention.

In Figure 1, S is a part of the stator and R is the rotor of a homopolar high-frequency machine, shown in development. The rotor is constituted simply by a rotating solid armature, on the circumference of which teeth $z$ are provided; a magnetic flux of normally constant magnitude and direction exists between the rotor and the stator as indicated by dotted lines and arrows, $n1$, $n2$, $n3$ etc. are the slots of the stator, the pitch of which is equal to half the tooth-pitch of the rotor. In consecutive pairs of slots $n1$—$n2$, $n3$—$n4$, stator coils all wound in the same direction are arranged, all being connected together in series, such as is also illustrated more particularly in Figs. $4b$ and $5b$.

If one winding embedded in the slots $n1$ and $n2$ is considered, it will be seen that the magnetic flux traversing this winding is subject, on rotation of the teeth $z$ of the rotor, to temporary fluctuations between a maximum value $\phi$ max. and a minimum value $\phi$ min., on account of periodic changes of the magnetic reluctance produced by a tooth and the consecutive slot respectively, as indicated by the time curve in Figure $1b$, the zero time point of which corresponds to the rotor position according to Figure $1a$. The curve of the time variation of the magnetic flux enclosed by the coil, is theoretically triangular as shown in Figure $1b$; in practice, the curve will appear more or less rounded off, but, for the sake of simplicity of illustration, the ideal form will be retained. These variations of the flux traversing the stator coil, produce in the latter voltages $$e = \frac{-d\phi}{dt}$$

the curve of which is shown in Figure 1c and, according to the variation of the flux assumed in Figure 1b, the induced voltage curve will have the shape of a rectangle. The frequency of the alternating current thus obtained is given by the formula $$f = \frac{z.n.}{60},$$

in which $z$ is the total number of teeth of the rotor and $n$ the number of revolutions per minute. It is understood that with this type of machine, a double frequency is obtained as compared with the normal type of alternating current generator which is based on the double pole principle and whereby a north pole and a south pole are alternately moving past the induced winding. Thus, referring to Fig. 1, the magnetic flux passing the teeth Z to the stator, would be reversed alternately and it would afford two consecutive teeth, one being a north pole and the other being a south pole, to move past the winding placed, e. g., in slots $n_1$ and $n_2$ (see Fig. 1) in order to induce one complete cycle. In the present type of machine, on the other hand, the flux, as to its magnitude as well as direction, is normally the same for each of the teeth as shown by the arrows in the drawings and it is necessary to move only one tooth past the winding in order to subject the magnetic flux to one complete cycle of variation and to induce a corresponding complete alternating current wave. This explains the aforementioned formula in which Z constitutes the total number of teeth, whereas in a conventional double pole type machine, Z would be the number of pairs of poles, each pair consisting of a north pole and a south pole.

The present invention makes use of this principle by means of which currents of one or more frequencies $f' = x. f.$, in which $x$ is some whole number, can be obtained either alone or simultaneously with those of the frequency $f$. According to the invention, this is done by making the pitch of the generating winding equal to a fraction, which may correspond to the number $x$, of half the tooth pitch of the rotor. For the generation of the treble frequency of the value given by the above formula $$f = \frac{z.n.}{60},$$

the winding pitch on the stator must be made therefore equal to one third of half the tooth-pitch of the rotor, such a construction is shown in Figure 2a.

The variation of the magnetic flux embraced by a coil, for instance $n1-n2$, takes place, as will be easily seen, in accordance with a trapeze-shaped curve as shown in Figure 2b, the enclosed flux retaining a constant value during a portion of the time within which a tooth rotates in front of a coil. The voltage which is generated in such a coil has then an unsteady shape as shown in Figure 2c.

If however corresponding coils arranged on the circumference of the stator and situated in the slots $n1-n2$, $n3-n4$, $n5-n6$, as is the case in the construction according to Figure 1, are connected in series, individual voltage curves will add consecutively and the total voltages resulting will be a continuous curve as shown in Figure 2d, the frequency of which is a corresponding multiple of the fundamental frequency corresponding to the number of the rotor teeth and determined in accordance with the above formula. In addition to the theoretical shape of the curve, the practically existing rounded off portions which give the whole more-or-less the form of a sine curve are shown.

Figure 3 shows one form of practical application of the invention to a calling machine for telephone exchanges of the above mentioned kind, which is distinguished by the greatest simplicity and, therefore, owing to its cheapness and also to its reliable working even for the smallest stations such as private exchanges, is considerably superior to similar devices such as buzzers etc. hitherto used and intended for the same purpose.

A normal direct current motor with the poles N and S and armature A is rotated by a source of direct current such as a battery. A magnetic flux of constant magnitude and direction is established between the north pole N and the south pole S and passes through the armature A. The exciting winding on the poles has been omitted in the drawing for the sake of clearness and the commutator with the brushes must be assumed to be arranged at the opposite end. The armature is a standard direct-current armature and is provided with a winding $w_a$, which, in addition to its connection to the commutator, is connected in the well-known manner to two slip rings $s$ from which alternating current can be taken. The machine has so far the character of a standard rotary converter. Such an arrangement is identical to a normal rotary converter and is shown for the sake of illustration and completeness in Fig. 6, where the normal direct current armature winding supplied from a power supply across the brushes B, is tapped at suitable points to be connected to slip rings for taking off the low frequency 25 cycle current.

By proper dimensioning of the parts the alternating current taken from the armature winding can have, for instance, the desired frequency of 25 periods per second for feeding the calling devices. For the generation of the other frequencies demanded, in the pole shoes of the poles N and S slots are provided in which are arranged, on the one hand, a winding $w150$ for the generation of a current of the number of periods 150 per sec., and at the same time another winding $w450$ for the generation of an alternating current with the number of periods 450 per sec. The pitch of the slots for the winding $w150$ is equal to half the tooth-pitch of the armature, and the arrangement agrees with that of Figure 1, but that of the slots for the winding $w450$ is, in accordance with this invention, equal to one third of half the tooth-pitch.

In Fig. 4, the arrangement of the stator winding on the north pole in accordance with Fig. 3, is shown in more detail in a front view whereby the contour of the pole is shown in a stretched out or developed manner. $n_1$ to $n_{10}$ represent slots for the windings. The distance between $n_1$ and $n_4$ corresponds to the widths of one-half armature tooth pitch Z as readily understood in connection with Figs. 1 and 2. A winding for producing a lower frequency such as for instance, 150 cycles, is arranged having a pitch equal to one-half of the tooth pitch of the armature such as shown in Fig. 1. At the same time, a second winding for a three-fold frequency; that is, in the example chosen, 450 cycles, is arranged having a winding pitch which is one-third of one-half the tooth pitch of the armature in accordance with a diagram shown by Fig. 2. The same arrangement is shown in Fig. 4b. The difference between the winding arrangement of Figs. 4a and 4b consists in that in the former, consecutive coils are arranged at a distance from each other by one winding pitch, whereas in the latter case, consecutive coils are arranged closely following each other in a manner well known in the art. The arrangement of Fig. 4a is preferable in cases where a low voltage is required and the arrangement of Fig. 4b serves for producing high voltages which requires a higher number of turns. The same arrangement of the winding may be used for the corresponding south pole of the machine.

The two windings $w150$ and $w450$ could be partly embedded in a single slot, a mutual disturbing action does not in practice take place. In order still further to simplify the machine, the slip rings, or only one slip ring, could be dispensed with, for instance by connecting the central point of the armature winding to one slip ring, or directly to the armature iron, and by collecting the alternating current of the lower frequency from a brush sliding on this slip ring or from a spring pressed against the spindle end on the one hand, and from one of the two commutator brushes of the direct-current end on the other hand. The current thus obtained has a wave-shape which, after passing through a transformer, assumes pure alternating-current shape. This may be seen with reference to Fig. 3 in which the inner slip-ring S would correspond to the shaft of the generator upon which is sliding a brush whereas the remaining slip-ring would be one of the normal kind, electrically insulated from the machine shaft.

In a similar way two or more frequencies could be generated with one and the same machine. The construction according to Figure 3 can be still further simplified by arranging the windings for the single frequencies on each pole separately, that is to say the winding $w150$ on the pole N and the winding $w450$ on the pole S. This is more particularly illustrated by Fig. 5 which is similar to Fig. 4 and according to which both kinds of windings; namely, the 150 cycle winding and the 450 cycle winding are not arranged together but separate from each other; that is, the first one in slots of the pole piece of the north pole N (Fig. 5a) and the latter in slots of the pole piece of the south pole S (Fig. 5b). An efficacious utilization of the machine could also be ensured by arranging the single coils consecutively in each two slots $n_1$—$n_2$, $n_2$—$n_3$ $n_3$—$n_4$ etc. as is also done in high-frequency machines, in which case, however, the successive coils must be always wound alternately in opposite direction in order to obtain an addition of the voltages generated, such as referred to and explained above in connection with Fig. 4b.

Figure 6 shows, for the sake of a better understanding of the invention, a wiring diagram for the armature of the machine, according to Figure 3, of conventional design. The rotor winding is an ordinary direct current winding provided, on the one hand, with a commutator K for direct current power supply and, on the other hand, with slip rings for supplying the alternating current output current. In this case, the direct current supplied to the commutator produces the uni-directional flux through the poles N and S and the armature, but it is understood that a pure direct current motor or generator may be used for producing a multi-frequency current, in accordance with the spirit of the invention. The magnetizing windings for the poles N and S have not been shown, for clearness of illustration.

What I claim is:—

1. In an alternating current electric machine operating on the homopolar variable reluctance principle comprising a rotor provided with teeth and slots, a stator, means to produce a normally constant and unidirectional magnetic flux between said stator and said rotor, a generating winding on said stator having a winding pitch equal to the width of said rotor teeth, for producing an alternating current of predetermined frequency, an armature winding of a standard direct current type arranged in the slots of the said rotor, slip-rings of said rotor connected to tap points of said armature winding to supply a current of lower frequency, and at least one further generating winding on said stator having a winding pitch which is a fraction of the width of said rotor teeth for producing a current having a frequency which is a harmonic of said first mentioned current.

2. In a multi-frequency dynamo electric machine comprising a direct current-alternating current rotary converter having a rotating slotted armature with teeth and slots of equal width and provided with a communtating winding and slip-rings, a stationary system of magnetizable pole pieces cooperating therewith and means to produce further alternating current of different frequency comprising a further winding arranged in the pole pieces of said stationary system and having a winding pitch which is a fraction of one-half the tooth pitch of said armature.

3. In a multi-frequency dynamo electric machine comprising a stationary system of magnetizable pole pieces, a slotted armature having slots and teeth of equal width, a winding and slip-rings associated therewith, to produce alternating current of a low frequency and a plurality of further windings arranged in the pole pieces of said stationary system and having winding pitches which are fractions of the tooth pitch of said armature teeth.

4. In a multi-frequency dynamo electric machine comprising a direct current-alternating current rotary converter having a toothed armature provided with a commutator, a winding and slip-rings, a stationary system of magnetizable pole pieces cooperating therewith and means to produce further alternating current of different frequency comprising a further winding arranged in the pole pieces of said stationary system and having a winding pitch which is a fraction of the width of the teeth of the said armature.

5. A multi-frequency alternating current dynamo electric machine, operating on the variable reluctance principle, comprising a stator, a toothed rotor, at least two generating windings arranged on said stator, the pitch of each of said generating windings being a different fraction of the pitch of the teeth of said rotor.

In testimony whereof I have affixed my signature.

WILHELM LANGEWIESCHE.